No. 724,467. PATENTED APR. 7, 1903.
L. HANSEN.
GILL NET.
APPLICATION FILED NOV. 15, 1902.
NO MODEL.
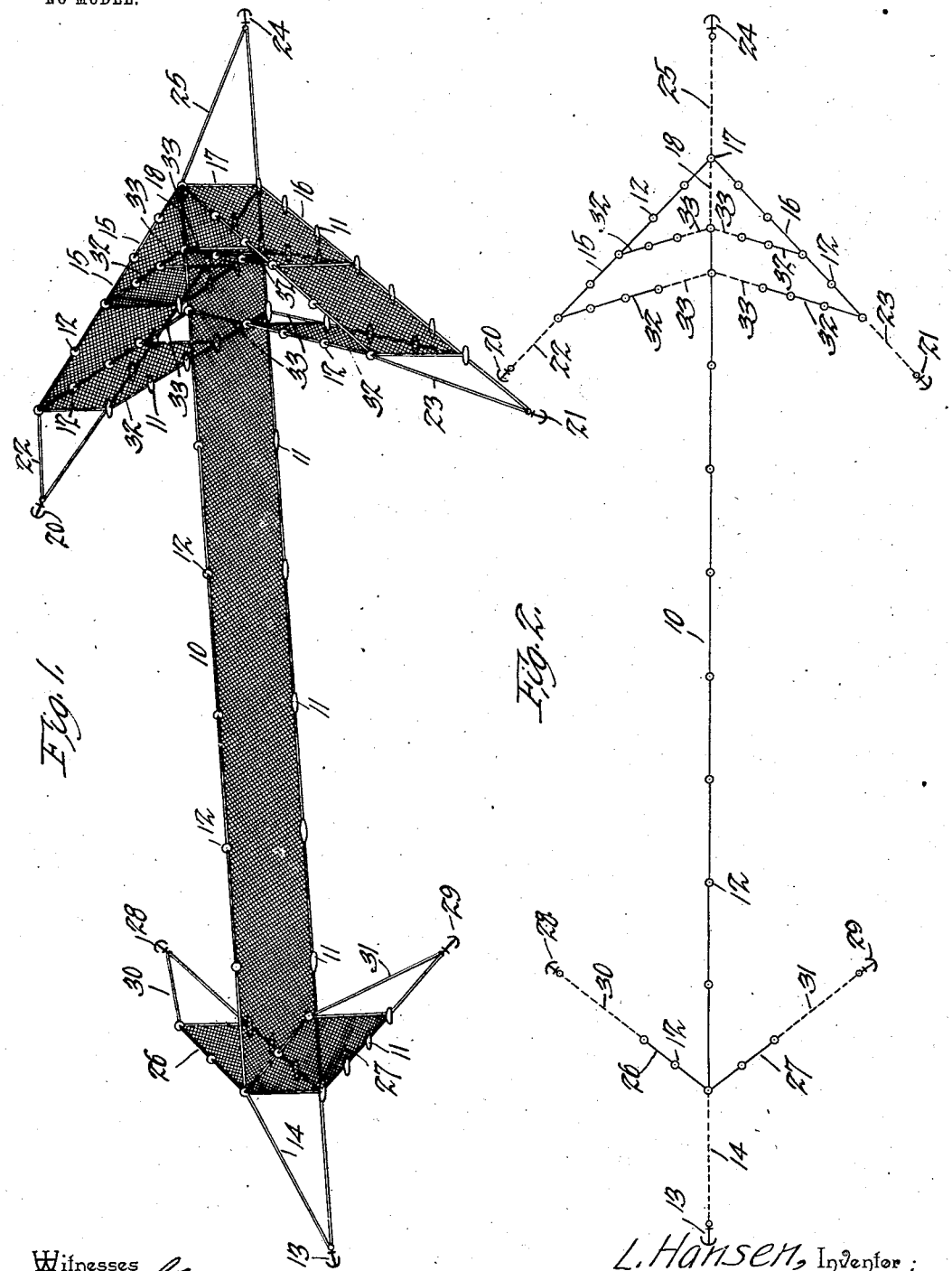

UNITED STATES PATENT OFFICE.

LUDVIG HANSEN, OF ANGOLA, NEW YORK.

GILL-NET.

SPECIFICATION forming part of Letters Patent No. 724,467, dated April 7, 1903.

Application filed November 15, 1902. Serial No. 131,551. (No model.)

*To all whom it may concern:*

Be it known that I, LUDVIG HANSEN, a citizen of the United States, residing at Angola, in the county of Erie and State of New York, have invented a new and useful Gill-Net, of which the following is a specification.

This invention relates to fish-nets, more particularly to that class known as "gill-nets," and has for its object the production of a device whereby the fish will be guided into engagement with the net and caught thereby; and the invention consists in certain novel features of construction and arrangement of the parts, as hereinafter described, and specified in the claims following.

In the drawings illustrative of the invention, in which like designating characters are employed to denote corresponding parts in each of the figures, Figure 1 is a perspective view of the improved device complete. Fig. 2 is a diagrammatic plan view.

The improved device consists in a "lead-net" of the ordinary construction, preferably of a fine mesh, or what is known as the "gill-net" form, in which the fish are caught in their attempts to pass through the net, the net portion being indicated at 10, suitably bound upon the edges, with spaced weights 11 attached to the lower edge and floats 12 similarly attached to the upper edge, the weights and floats coacting to maintain the net in a vertical position in the water, as will be obvious. The lead-net will be of any suitable length and width, depending largely upon the depth of the water and the area of the fishing-ground where located, and will generally be placed leading offshore. The net 10 will be anchored at one end, the anchor being indicated at 13 at a suitable distance from the end of the net and connected thereto by a cable 14, as indicated.

Opposite the free end of the lead-net 10 are primary wing-nets 15 16, united at 17 opposite the free end of the lead-net 10 and spaced therefrom and connected to the free end of the lead-net by guys 18, by which means an interval or gap is left between the free end of the net 10 and the point of juncture of the wing-nets 15 16. The primary wing-nets 15 16 are provided with floats upon their upper edges and weights or sinkers upon their lower edges spaced apart in the same manner and performing the same functions as the like floats and sinkers upon the lead-net, and as all the various nets in the device will be provided with the spaced floats and sinkers disposed in substantially the same manner and for the same purpose like designating characters will be employed to denote the floats and sinkers upon all parts of the device. The primary wing-nets 15 16 will be disposed obliquely to the lead-net 10 and extend in opposite directions upon each side of the lead-net toward the anchored end thereof, as shown, the wing-nets thus forming two angular-shaped compartments or areas upon each side of the lead-net, the compartments thus formed connected by the gap between the free end of the lead-net and the uniting-point of the wing-nets, as shown. By this arrangement when the fish come in contact with the lead-net they will either be caught in its meshes in the ordinary manner or will swim parallel to the lead-net in attempting to pass around it and will become involved in the angular-shaped compartments between the lead-net and the wing-nets and in their efforts to escape will become entangled in the meshes of the net. By this arrangement the fish will be guided into engagement with the wing-nets from both sides of the lead-net equally, so that no matter from which side they approach the device they will become involved with the nets.

The primary wing-nets will be suitably supported at their outer ends by anchors 20 21, connected thereto by cables 22 23, respectively, and the apex or meeting-point 17 will be likewise supported by an anchor 24 and cable 25, the latter disposed in longitudinal alinement with the lead-net 10 and guy 18, as indicated. By this means it will be obvious that the three net-sections 10 15 16 will be maintained in their relative positions vertically.

Attached to the anchored end of the lead-net 10 are obliquely-disposed smaller wing-nets 26 27, provided with the floats 12 and sinkers 11 and extending in opposite directions from the lead-net toward the free end of the latter and secured by suitable anchors 28 29 and cables 30 31, these latter wing-nets forming angular-shaped compartments adjacent to the anchored end of the lead-net, so that in event of the fish swimming toward the anchored end of the lead-net they will become involved in the meshes of these latter wing-nets, so that no matter in which direction the fish may swim they will come in contact with the nets.

Attached to the primary wing-nets 15 16 are secondary diagonally-disposed wing-nets 32, leading inwardly toward the lead-net and connected thereto by guys 33, by which they are maintained in position, as indicated. Any desired number of the secondary wing-nets 32 may be employed; but for the purpose of illustration two are shown upon each side. These secondary wing-nets 32 materially increase the maze into which the fish will be guided, and correspondingly materially decrease their chances for escape, as the secondary wing-nets form a plurality of V-shaped compartments opening outwardly along the inner surfaces of the primary wing-nets. By this simple arrangement a confusing series of V-shaped compartments or areas are formed, into which the fish will be guided and involved, and in their attempts to escape will be caught by some portions of the net-surfaces.

The device may be constructed in any desired proportions and the nets of any desired relative widths and lengths to adapt them to the "ground" in which they are located and may be readily adapted to any depth of water or to any strength of current or the movements of the tides.

It will be noted that no stakes or other permanent fixtures are employed, dependence being had entirely upon the anchors coacting with the floats and sinkers to maintain the device in position. By this means it will be obvious that the device may be located at any desired point and readily shifted from place to place without the necessity for driving stakes or erecting other stationary supports. The device is thus readily applicable to any form of fishing-ground and may be constructed to adapt it to all the varying conditions met with in operating devices of this character.

The floats 12 and sinkers 11 may be increased or decreased in size as may be required to enable the device to be properly supported in the water.

Having thus described the invention, what is claimed is—

1. In a device of the character described, a lead-net having supporting sinkers and floats, wing-nets having supporting sinkers and floats and united opposite one end of said lead-net and spaced therefrom and extending diagonally in opposite directions, guy lines connecting said wing-nets and lead-net, and anchors disposed to support said wing-nets and lead-net in relative position, substantially as described.

2. In a device of the character described, a lead-net having supporting sinkers and floats, primary wing-nets having supporting sinkers and floats and united opposite one end of said lead-net and spaced therefrom and extending diagonally in opposite directions, guy-lines connecting said wing-nets and lead-net, secondary wing-nets connected to said primary wing-nets and leading diagonally inward therefrom, guy-lines connecting said primary wing-nets to said lead-net, and anchors disposed to support said wing-nets and lead-net in position, substantially as described.

3. In a device of the character described, a lead-net having supporting sinkers and floats, primary wing-nets having supporting sinkers and floats and united opposite one end of said lead-net and spaced therefrom and extending diagonally in opposite directions, guy-lines connecting said primary wing-nets and lead-net, a plurality of secondary wing-nets spaced apart and connected to said primary wing-nets and leading diagonally inward therefrom, guy-lines connecting said primary wing-nets to said lead-net, and anchors disposed to support said wing-nets and lead-net in position, substantially as described.

4. In a device of the character described, a lead-net having supporting sinkers and floats, primary wing-nets having supporting sinkers and floats and united opposite one end of said lead-net and spaced therefrom and extending diagonally in opposite directions, guy-lines connecting said primary wing-nets and lead-net, wing-nets connected to the opposite end of said lead-net and leading diagonally therefrom in opposite directions, and anchors disposed to support said wing-nets and said lead-net in position, substantially as described.

5. In a device of the character described, a lead-net having supporting sinkers and floats, primary wing-nets having supporting sinkers and floats and united opposite one end of said lead-net and spaced therefrom and extending diagonally in opposite directions, guy-lines connecting said wing-nets and lead-net, secondary wing-nets connected to said primary wing-nets and leading diagonally therefrom, guy-lines connecting said primary wing-nets to said lead-net, wing-nets connected to the opposite end of said lead-net and leading diagonally therefrom in opposite directions, and anchors disposed to support said wing-nets and lead-net in position, substantially as described.

6. In a device of the character described, the combination of a lead-net having supporting sinkers and floats, wing-nets having supporting sinkers and floats and diagonally disposed relative to said lead-net and spaced therefrom and positioned to form a plurality of V-shaped compartments opening toward said lead-net, substantially as described.

7. In a device of the character described, the combination of a lead-net having supporting sinkers and floats, wing-nets having supporting sinkers and floats and diagonally disposed relative to said lead-net and spaced therefrom and positioned to form a plurality of V-shaped compartments opening toward said lead-net, and guy-lines connecting said wing-nets and lead-net, substantially as described.

8. In a device of the character described, the combination of a lead-net having supporting sinkers and floats, wing-nets having supporting sinkers and floats and diagonally disposed relative to said lead-net and spaced therefrom and positioned to form a plurality of V-shaped compartments opening toward said lead-net, guy-lines connecting said wing-nets and lead-net, and anchors disposed to support said lead-net and wing-nets in relative position, substantially as described.

In testimony that I claim the foregoing as my own I have hereto affixed my signature in the presence of two witnesses.

LUDVIG HANSEN.

Witnesses:
BURRELL S. MARTIN,
FRANK SWEETLAND.